US012686026B2

(12) United States Patent
Keller

(10) Patent No.: US 12,686,026 B2
(45) Date of Patent: Jul. 21, 2026

(54) HAND TOOL AND FILTER APPARATUS

(71) Applicant: Milwaukee Electric Tool Corporation, Brookfield, WI (US)

(72) Inventor: Jonathan S. Keller, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 556 days.

(21) Appl. No.: 18/228,310

(22) Filed: Jul. 31, 2023

(65) Prior Publication Data

US 2024/0066544 A1 Feb. 29, 2024

Related U.S. Application Data

(60) Provisional application No. 63/401,838, filed on Aug. 29, 2022.

(51) Int. Cl.
| | |
|---|---|
| *B05B 15/40* | (2018.01) |
| *B01D 27/08* | (2006.01) |
| *B05B 7/24* | (2006.01) |
| *B05B 15/65* | (2018.01) |

(52) U.S. Cl.
CPC .............. *B05B 15/40* (2018.02); *B01D 27/08* (2013.01); *B05B 7/2402* (2013.01); *B05B 15/65* (2018.02); *B01D 2201/4015* (2013.01)

(58) Field of Classification Search
CPC ....... B05B 1/14; B05B 7/2402; B05B 7/2475; B05B 9/08; B05B 15/65; B01D 27/08; B01D 2201/4015
USPC ....... 239/34, 53, 55, 59, 152–154, 332, 333, 239/553–553.5, 590–590.5, 600
See application file for complete search history.

(56) References Cited

U.S. PATENT DOCUMENTS

| | | | |
|---|---|---|---|
| 7,485,163 B2* | 2/2009 | Yoshimoto | ......... B01D 46/2407 239/153 |
| 2012/0256015 A1* | 10/2012 | Thomason | ............ A61M 35/25 239/296 |
| 2023/0294117 A1* | 9/2023 | Pereira | .................. B05B 7/2464 239/154 |

\* cited by examiner

*Primary Examiner* — Steven J Ganey
(74) *Attorney, Agent, or Firm* — Dority & Manning, P.A.

(57) ABSTRACT

A sprayer assembly and a filter apparatus for a hand tool are provided, including a reservoir wall forming a first side separating a second side. The first side forms an exterior volume and the second side forms an interior volume. An outlet body is connectable to the reservoir wall. The outlet body forms an inlet opening and an outlet opening and a flowpath extending between the inlet opening and the outlet opening. The outlet body includes a body wall forming an attachment interface. A filter assembly includes a filter wall from which a tab extends. A filter element is positioned at the filter wall and the filter wall is slidable to the body wall at the attachment interface.

20 Claims, 6 Drawing Sheets

HAND TOOL AND FILTER APPARATUS

The present application claims the benefit of priority to U.S. provisional patent application Ser. No. 63/401,838, filed on Aug. 29, 2022, the disclosure of which is incorporated herein by reference in its entirety.

FIELD

Field

The present disclosure relates generally to filter assemblies, and particularly to filter apparatuses for hand-held sprayers and hand tools.

Background

Users of hand tools, such as portable sprayers, would benefit from longer usage and action and less interruption when performing tasks. However, users may be interrupted by requiring replacement of filters at tanks. Additionally, cumbersome filters may discourage or inhibit regular or timely replacement of a filter and allow particulate matter to egress from the hand tool or clog a sprayer, wand, nozzle, or other portions of the hand tool. Such clogging may disrupt fluid flow or require a user to disassemble the hand tool to clean various components. Such down-time related to clogging is undesired.

Accordingly, improved filters and hand tools with such filters are desired in the art.

BRIEF DESCRIPTION

Aspects and advantages of the invention in accordance with the present disclosure will be set forth in part in the following description, or may be obvious from the description, or may be learned through practice of the technology.

An aspect of the present disclosure is directed to a sprayer assembly. The sprayer assembly includes a reservoir wall forming a first side separating a second side. The first side forms an exterior volume and the second side forms an interior volume. An outlet body is connectable to the reservoir wall. The outlet body forms an inlet opening and an outlet opening and a flowpath extending between the inlet opening and the outlet opening. The outlet body includes a body wall forming an attachment interface. A filter assembly includes a filter wall from which a tab extends. A filter element is positioned at the filter wall. The filter wall is slidable to the body wall at the attachment interface.

Another aspect of the present disclosure is directed to a filter apparatus. The filter apparatus includes a body forming a first opening and a second opening and a flowpath extending between the first opening and the second opening. The body includes a body wall forming an attachment interface. A filter assembly includes a filter wall from which a tab extends. A filter element is positioned at the filter wall. The filter wall is slidable to the body wall at the attachment interface.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

Figure 1:
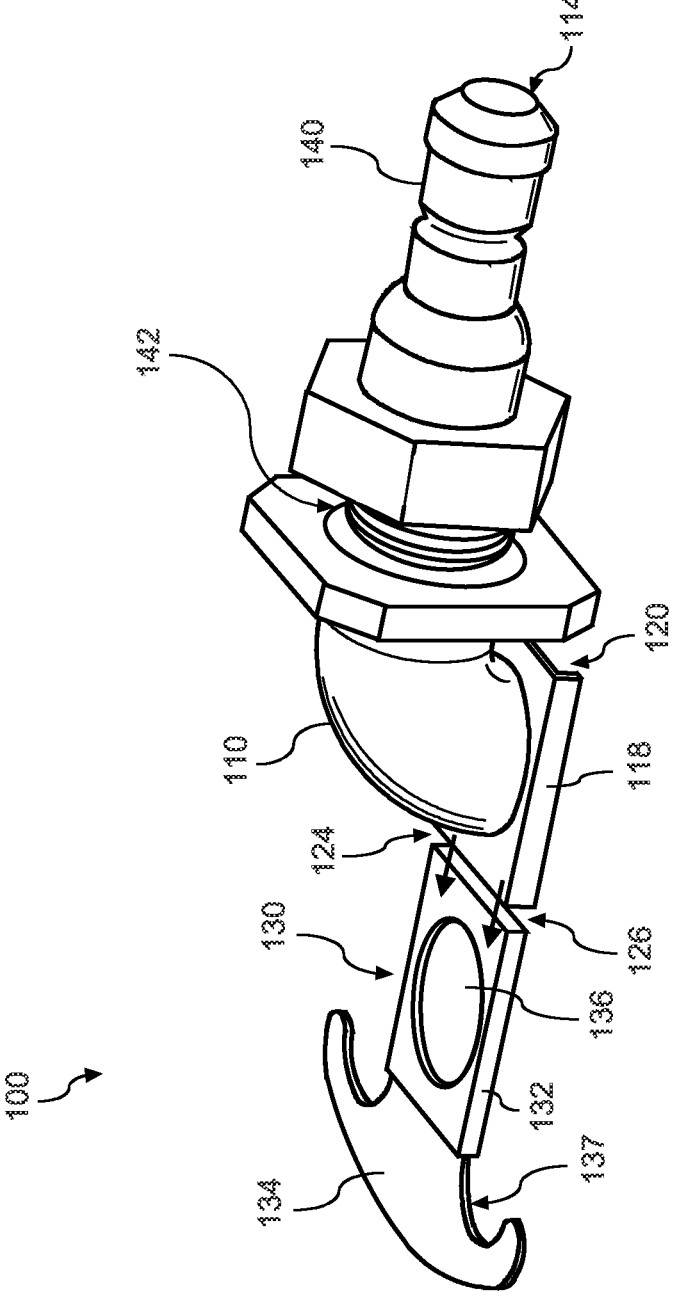
FIG. 1 is a perspective view of an exemplary embodiment of a filter apparatus in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of a sprayer assembly and a filter apparatus are provided herein. Embodiments of the filter apparatus and the sprayer assembly including the filter apparatus include a removable, slidable filter element at the filter apparatus, allowing for improved quick removal and replacement of the filter element. Embodiments provided herein may include a portable sprayer assembly, such as a hand-held or backpack sprayer assembly. Embodiments of the filter apparatus included herein may Referring now to the figures, embodiments of a filter apparatus 100 are provided. The apparatus 100 includes a body 110 forming a first opening 112. The apparatus 100 forms a second opening 114. The body 110 includes walls forming, at least in part, a flowpath 116 between the first opening 112 and the second opening 114. The body 110 includes a body wall 118 forming an attachment interface 120, such as described in further detail herein.

In particular embodiments, such as further described herein. the first opening 112 may form an inlet opening through which a fluid enters into the flowpath 116 and egresses through the second opening 114 forming an outlet opening. The fluid may include a liquid, a gas, a combination thereof, or one or more thereof including a solid or particulate matter. In still particular embodiments, the body 110 forms the attachment interface 120 at the first opening 112. In still particular embodiments, the body 110 forms the attachment interface 120 at the body wall 118 at the first opening 112.

The apparatus 100 includes a filter assembly 130 including a filter wall 132. A handle, wing, platform, or generally a tab 134 extends from the filter wall 132. The tab 134 may include any desired structure promoting handling, gripping, grabbing, pulling, or pushing by a user, such as to desirably position and remove the filter assembly 130 to and from the attachment interface 120. In various embodiments, the tab 134 may include grooves, bumps, raised material, textured surfaces, or desired roughness to promote handling, gripping, grabbing, pulling, or pushing by the user. The tab 134 may extend from the filter wall 132, such as to allow the user to position a filter element 136 at the attachment interface 120 as further described herein.

The filter assembly 130 includes the filter element 136 formed or positioned at the filter wall 132. The filter wall 132 is slidable to the body wall 118 at the attachment interface 120. The filter element 136 may include any suitable filter, such as to inhibit or prohibit flow of solids or particulate matter generally into flowpath 116 or through second opening 114. In certain embodiments, the filter element 136 may form a flow control device, such as an orifice, configured to generate a desired pressure differential relative to opposing sides of the filter element 136 (e.g., a first side at or proximate to the flowpath 116 and a second side distal to or separated from the flowpath 116 by the filter element 136).

In various embodiments, the attachment interface 120 includes a rail 122 extending along a sliding direction 124 along which the filter wall 132 is positioned or removed from the attachment interface 120. The rail 122 forms a track along which the filter wall 132 is slidable along the sliding direction 124. Accordingly, the filter element 136 positioned at the filter wall 132 may be positioned at the first opening 112 to inhibit or prohibit entry of solids into the flowpath 116 or to generate a desired pressure differential.

In still particular embodiments, the attachment interface 120 forms an open end 126 through which the filter wall 132 is slidable into the attachment interface 132, such as described herein. In certain embodiments, the attachment interface 120 includes a stop wall 127 forming a closed end 128 along the sliding direction 124. The stop wall 127 may form a limit along the sliding direction 124 along which the filter element 136 is desirably positioned relative to the flowpath 116.

In certain embodiments, tab 134 may additionally, or alternatively, include a stop wall 137 configured to form a limit along the sliding direction 124 into which the filter wall 132 may be positioned at the attachment interface 120. The stop wall 137 at tab 134 may form a radius, curvature, angle, or other feature diverging from a perimeter of the filter wall 132. The stop wall 137 may extend greater than a distance between rails 122, such that the stop wall 137 forms a limit along the sliding direction 124 at which the filter wall 132 may be positioned.

Figure 3:
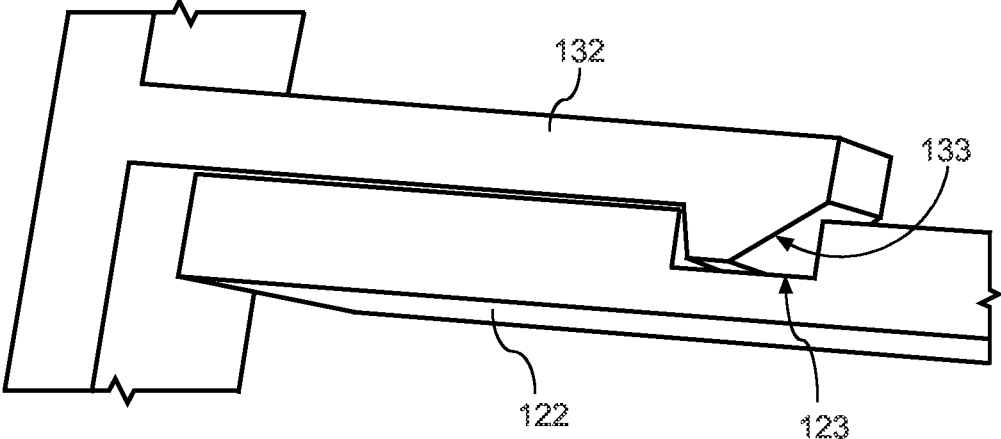
FIG. 3 is a perspective view of a portion of an exemplary embodiment of a filter apparatus in accordance with aspects of the present disclosure.

Referring to FIG. 3, a perspective view of a portion of an embodiment of the filter apparatus 100 is provided. FIG. 3 depicts an embodiment of the rail 122 forming a notch 123. FIG. 3 further depicts an embodiment of the filter wall 132 forming a key 133. Key 133 is configured to extend toward notch 123. The key 133 and notch 123 may together form a locking mechanism configured to retain the filter assembly 130 at the body 110. In various embodiments, the filter wall 132, the rail 122, or portions thereof, may be formed of a compliant material. The compliant material may allow a user to bend, twist, flex, or elastically deform the filter wall 132 or the rail 122 to allow the key 133 to exit the notch 123, such as to remove the filter assembly 130 from the body 110.

Referring to FIG. 1, in certain embodiments, the apparatus 100 may include a nozzle 140 attachable to the body 110 at or proximate to the second opening 114. In such embodiments, the flowpath 116 may extend through the body 110 and the nozzle 140. The second opening 114 may form an outlet opening from the flowpath 116, such as described herein. Accordingly, in various embodiments, the second opening 114 is formed at the nozzle 140.

In certain embodiments, the nozzle 140 is releasably attachable to the body 110 at a coupling interface 142. The coupling interface 142 may form a thread, a fit, a snap, or other appropriate interface at which the body 110 and the nozzle 140 attach. For instance, the coupling interface 142 may include an internal thread and an external thread or male/female interface positioned at the body 110 and nozzle 140. In various embodiments, the nozzle 140 may include a fastener, such as a hexagonal head or geometry at which a user may tighten or loosen the nozzle 140 from the body 110. In still various embodiments, the coupling interface 142 may form a tight-fit interface, an interference-fit interface, or an interface at which an adhesive may couple and seal the nozzle 140 and the body 110 together. Still various embodiments of the nozzle 140 may form any appropriate geometry at which a sprayer device, conduit, manifold, or additional nozzle may attach to the nozzle 140, such as further described herein.

Figure 2:
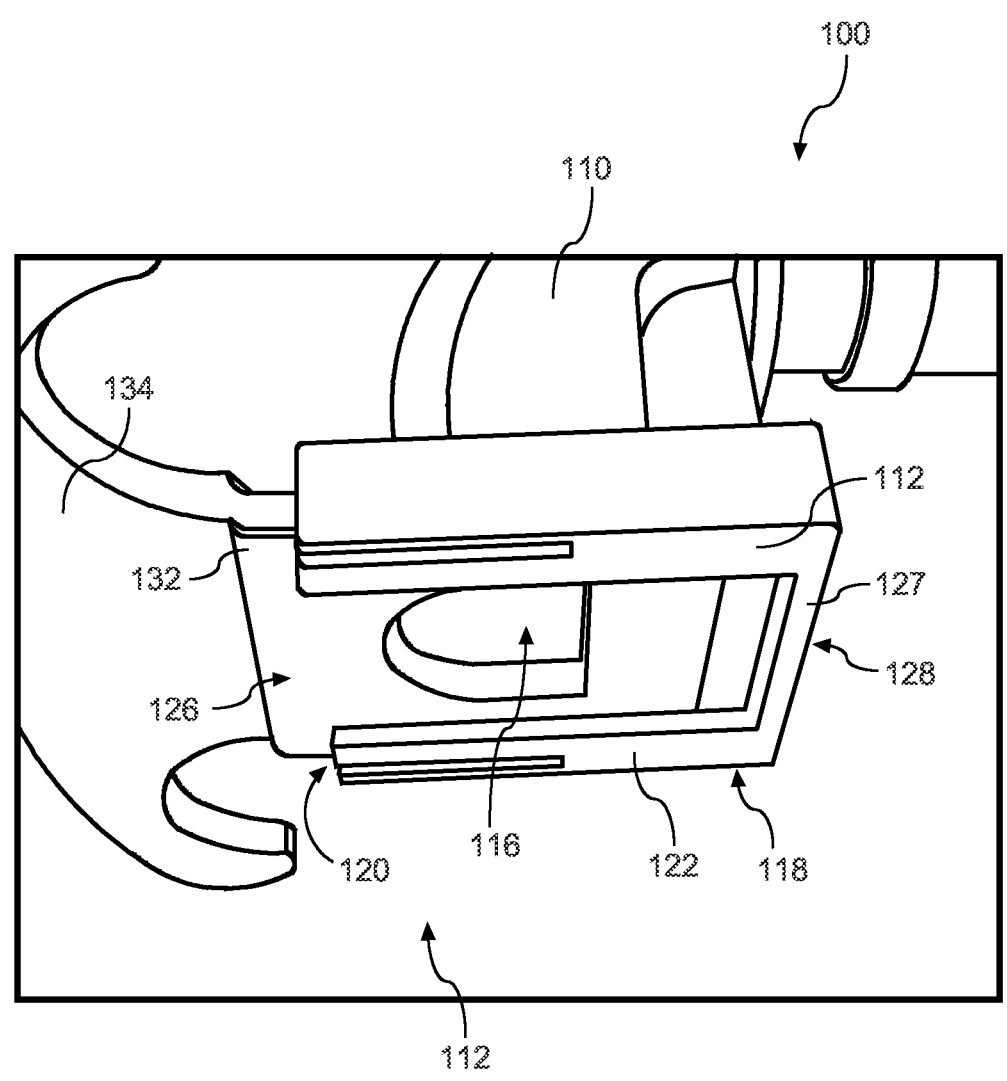
FIG. 2 is a perspective view of an exemplary embodiment of a filter apparatus in accordance with aspects of the present disclosure.
Figure 4:
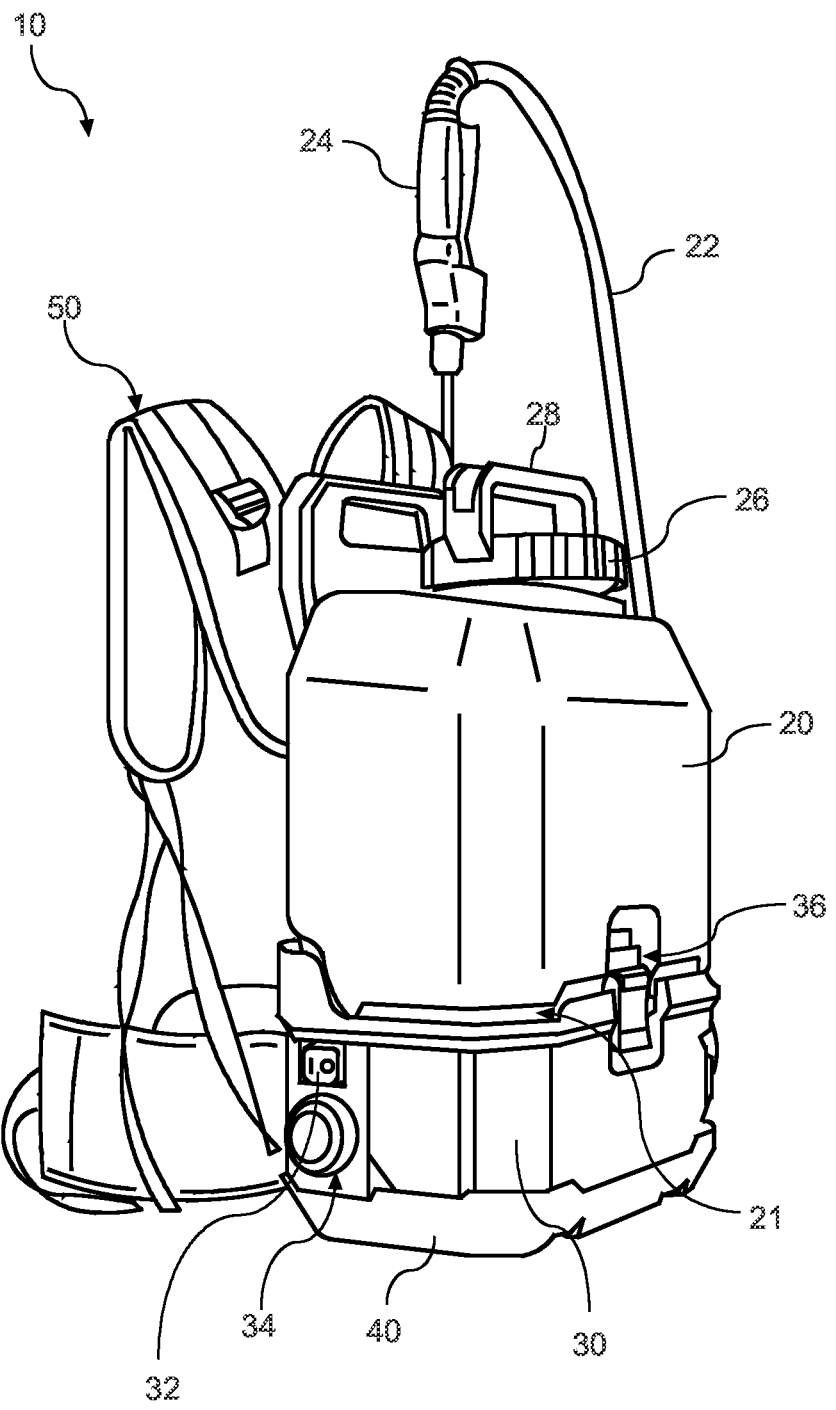
FIG. 4 is a perspective view of an exemplary embodiment of a hand tool at which embodiments of the filter apparatus is included in accordance with aspects of the present disclosure.

Referring now to FIG. 4, a perspective view of an embodiment of a hand tool 10 is provided at which embodiments of the apparatus 100 (FIGS. 1-2) may be included. The embodiment of hand tool 10 depicted in FIG. 4 may particularly form a portable power sprayer having a tank, a manifold, or a reservoir 20 forming an interior side separated by one or more walls 21 from an exterior side. Hand tool 10 includes a power unit 30, such as may include any appropriate gas-powered or electric power unit or motor.

Various embodiments of the power unit 30 may include batteries, capacitors, AC power units, or other electric devices such as to operate a pump, compressor, impeller, rotary or linear drive device, diaphragm, or generally a machine drive system 60. The power unit 30 may include a power switch 32 configured to selectively supply and discontinue power to operate the drive system 60. In certain embodiments, the power unit 30 may include a power input 34 configured to receive a charge cable or power cord, such as to provide energy to the power unit 30 or operate the drive system 60.

The hand tool 10 may furthermore include a base 40 upon which the power unit 30, the reservoir 20, or both, may be disposed. A strap 50 may be configured in a backpack configuration, messenger-bag configuration, or other appropriate configuration of a retention device to a user, such as to allow a user to carry, handle, or otherwise move the hand tool 10.

A walled conduit 22 may extend from the second opening 114 (FIG. 1), such as to allow for fluid communication of the fluid from the reservoir 20 through a wand assembly 24. The conduit 22 may include any appropriate flexible, compliant material. The wand assembly 24 may include any appropriate nozzle, spray device, wand assembly, flow device, extension manifolds, triggers, or grips, as may be appropriate for dispensing the fluid.

A fastener interface 36 is formed at the reservoir 20 and power unit 30. The fastener interface 36 may form a clip, retainer, retention device, snap, or other interface configured to selectively attach and detach the reservoir 20 from the power unit 30. The fastener interface 36 may include a mechanical fastener, such as, but not limited to, a bolt, nut, screw, tie rod, or combinations thereof.

Still various embodiments may include a lid 26 at the reservoir 20, such as may be selectively opened and closed and allow a fluid to be provided within the reservoir 20. Lid 26 may include a handle 28 configured to allow a user to grab, e.g., with a single hand, the lid 26, or furthermore, the reservoir 20. Handle 28 may furthermore allow a user to grab the entire hand tool assembly. It should be appreciated that base 40, power unit 30, reservoir 20, strap 50, and other components depicted and described herein may, in various portions, be selectively attachable and detachable to one another. Still further embodiments may include separable interfaces at respective components. For instance, power unit 30 or reservoir 20 may include flanges and seals that may be integrated to one another as non-detachable assemblies or non-reattachable assemblies, or as selectively separable flanges and seals.

Figure 5:
FIG. 5 is a schematic view of an exemplary embodiment of a portable sprayer at which embodiments of the filter apparatus is included in accordance with aspects of the present disclosure.
Figure 5:
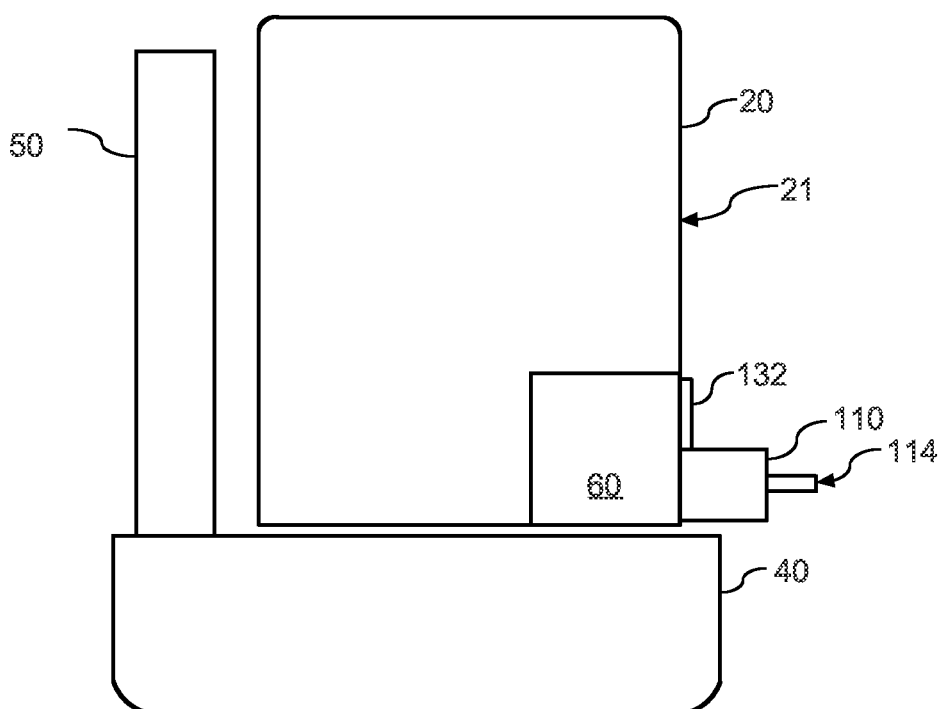
Figure 6:
FIG. 6 is a schematic view of an exemplary embodiment of a portable sprayer at which embodiments of the filter apparatus is included in accordance with aspects of the present disclosure.
Figure 6:
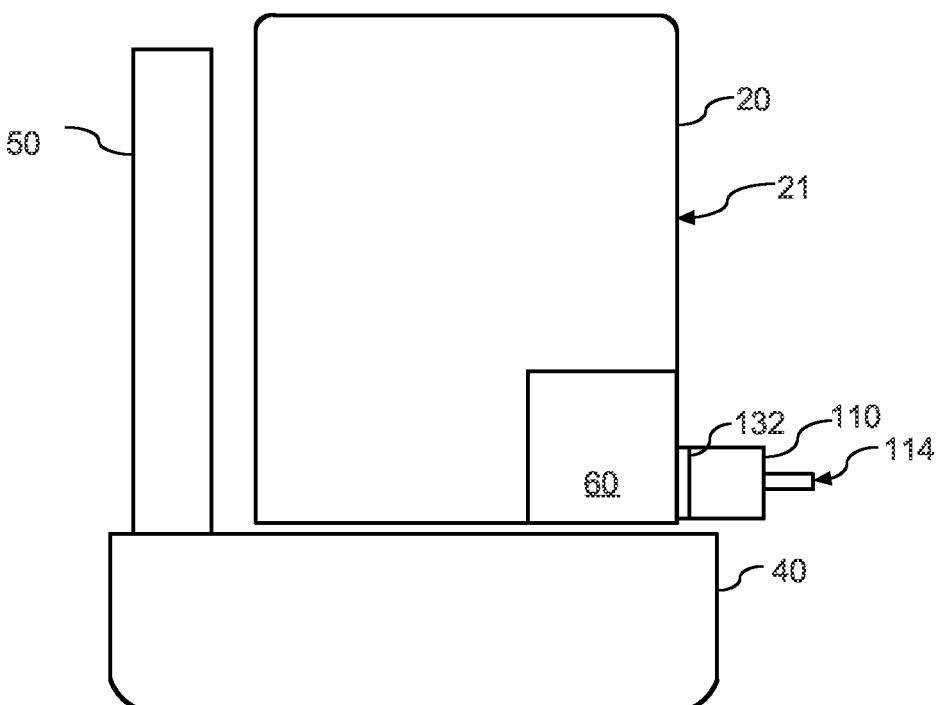

Referring now to FIGS. 5-6, a schematic view of an exemplary embodiment of a hand tool configured as a portable sprayer 11 is provided. Embodiments of the sprayer 11 may be configured as the hand tool 10 such as provided in FIG. 4. The schematic view provided in FIGS. 5-6 is partially exploded to more clearly depict contours and interfaces between various components. FIG. 5 depicts the filter assembly 130 in a first position at which the filter wall 132 is substantially removed from the body 110. Accordingly, the filter element 136 may be positioned out of fluid communication at the flowpath 16. FIG. 6 depicts the filter assembly 130 in a second position at which the filter wall 132 is substantially positioned at the body 110. Accordingly, the filter element 136 may be positioned in fluid communication at the flowpath 16.

Embodiments of the sprayer 11 include the apparatus 100 attached to the reservoir 20. In certain embodiments, portions of the apparatus 100 are formed or integrated to the reservoir 20. In an embodiment, the body 110 is integrally formed with the wall 21 at the reservoir 20. For instance, the body 110 and wall 21 may be formed through any appropriate manufacturing method, such as, but not limited to, extrusion, additive manufacturing, injection molding, or additionally or alternatively including a bonding process, such as, but not limited to, casting, brazing, welding, or application of a sealant, adhesive, other appropriate bonding process or medium.

In certain embodiments, the reservoir wall 21 forms a first side separating a second side. The first side forms an exterior volume and the second side forms an interior volume. The drive system 60 may be positioned within the interior volume. In certain embodiments, the drive system 60 is positioned within the reservoir 20. The body 110 is positioned in fluid communication with the drive system 60 to flow fluid through the outlet body 110.

Embodiments of the filter apparatus 100, hand tool 10, and portable sprayer 11 provided herein allow for quick placement and replacement of filter elements or flow control structures at a flowpath. Embodiments of the filter apparatus 100 provided herein may improve performance and durability of a hand tool or portable sprayer, such as by allowing for simple removal and replacement of filters. Quick and simplified removal and replacement of filter elements mitigates undesired buildup of particulate matter within flowpaths, such as a flowpath within the outlet body, a conduit connecting a wand assembly, the wand assembly, or various nozzles, fittings, flow control devices, or other structures at the hand tool or sprayer.

Embodiments of the filter apparatus 100 provided herein may allow a user to quickly and easily change a filter element to a different size or type of filter element. Such ease may allow a user to select different size or type filters that may be more appropriate for different types of fluids or uses at the hand tool or portable sprayer.

Further aspects and embodiments of the present subject matter are provided in the following clauses:

1. A sprayer assembly, the sprayer assembly including a reservoir wall forming a first side separating a second side, the first side forming an exterior volume and the second side forming an interior volume; an outlet body connectable to the reservoir wall, the outlet body forming an inlet opening and an outlet opening and a flowpath extending between the inlet opening and the outlet opening, the outlet body including a body wall forming an attachment interface; and a filter assembly including a filter wall from which a tab extends, wherein a filter element is positioned at the filter wall, and wherein the filter wall is slidable to the body wall at the attachment interface.

2. The sprayer assembly of any one or more clauses herein, wherein the outlet body is connectable to the reservoir wall at the first side.

3. The sprayer assembly of any one or more clauses herein, wherein the attachment interface at the outlet body is at the first side of the reservoir wall, and wherein the filter wall is slidable to the body wall at the attachment interface at the first side of the reservoir wall.

4. The sprayer assembly of any one or more clauses herein, wherein the attachment interface includes a rail extending along a sliding direction of the filter wall, wherein the rail forms a track along which the filter wall is slidable along the sliding direction.

5. The sprayer assembly of any one or more clauses herein, wherein the attachment interface forms an open end through which the filter wall is slidable into the attachment interface.

6. The sprayer assembly of any one or more clauses herein, wherein the body wall forms the attachment interface at the inlet opening.

7. The sprayer assembly of any one or more clauses herein, wherein the outlet body and the reservoir wall are integrally formed to one another.

8. The sprayer assembly of any one or more clauses herein, the sprayer assembly including a nozzle attachable to the outlet body at the outlet opening.

9. The sprayer assembly of any one or more clauses herein, the sprayer assembly including a drive system positioned within the reservoir, wherein the outlet body is positioned in fluid communication with the drive system to flow fluid through the outlet body.

10. The sprayer assembly of any one or more clauses herein, wherein the outlet body includes a stop wall forming a limit along a sliding direction along which the filter assembly extends into the attachment interface.

11. The sprayer assembly of any one or more clauses herein, wherein the tab includes a stop wall forming a limit along a sliding direction along which the filter assembly extends into the attachment interface.

12. The sprayer assembly of any one or more clauses herein, the sprayer assembly including a reservoir formed at least in part by the reservoir wall, wherein the reservoir is configured to receive a fluid, and wherein the outlet body is coupled in fluid communication with the reservoir to receive the fluid to the flowpath at the outlet body.

13. The sprayer assembly of any one or more clauses herein, the sprayer assembly including a walled conduit extending from the outlet opening, wherein the conduit is in fluid communication with the flowpath at the outlet body to receive the fluid therethrough.

14. A filter apparatus, the filter apparatus including a body forming a first opening and a second opening and a flowpath extending between the first opening and the second opening, the body including a body wall forming an attachment interface; and a filter assembly including a filter wall from which a tab extends, wherein a filter element is positioned at the filter wall, and wherein the filter wall is slidable to the body wall at the attachment interface.

15. The filter apparatus of any one or more clauses herein, wherein the attachment interface includes a rail extending along a sliding direction of the filter wall, wherein the rail forms a track along which the filter wall is slidable along the sliding direction.

16. The filter apparatus of any one or more clauses herein, wherein the attachment interface forms an open end through which the filter wall is slidable into the attachment interface.

17. The filter apparatus of any one or more clauses herein, wherein the body includes a stop wall forming a closed end limiting extension of the filter assembly into the attachment interface along the sliding direction.

18. The filter apparatus of any one or more clauses herein, wherein the stop wall includes a radius, a curvature, or an angle diverging from a perimeter of the filter wall.

19. The filter apparatus of any one or more clauses herein, wherein the body wall forms the attachment interface at the first opening.

20. The filter apparatus of any one or more clauses herein, the filter apparatus including a nozzle attachable to the body at the second opening.

21. A hand tool including the filter apparatus of any one or more clauses herein.

22. A sprayer assembly including the filter apparatus any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sprayer assembly, the sprayer assembly comprising:
a reservoir wall forming a first side separating a second side, the first side forming an exterior volume and the second side forming an interior volume;
an outlet body connectable to the reservoir wall, the outlet body forming an inlet opening and an outlet opening and a flowpath extending between the inlet opening and the outlet opening, the outlet body comprising a body wall forming an attachment interface; and
a filter assembly comprising a filter wall from which a tab extends, wherein a filter element is positioned at the filter wall, and wherein the filter wall is slidable to the body wall at the attachment interface.

2. The sprayer assembly of claim 1, wherein the outlet body is connectable to the reservoir wall at the first side.

3. The sprayer assembly of claim 2, wherein the attachment interface at the outlet body is at the first side of the reservoir wall, and wherein the filter wall is slidable to the body wall at the attachment interface at the first side of the reservoir wall.

4. The sprayer assembly of claim 1, wherein the attachment interface comprises a rail extending along a sliding direction of the filter wall, wherein the rail forms a track along which the filter wall is slidable along the sliding direction.

5. The sprayer assembly of claim 4, wherein the attachment interface forms an open end through which the filter wall is slidable into the attachment interface.

6. The sprayer assembly of claim 1, wherein the body wall forms the attachment interface at the inlet opening.

7. The sprayer assembly of claim 1, wherein the outlet body and the reservoir wall are integrally formed to one another.

8. The sprayer assembly of claim 1, the sprayer assembly comprising:

a nozzle attachable to the outlet body at the outlet opening.

9. The sprayer assembly of claim 1, the sprayer assembly comprising:

a drive system positioned at the interior volume, wherein the outlet body is positioned in fluid communication with the drive system to flow fluid through the outlet body.

10. The sprayer assembly of claim 1, wherein the outlet body comprises a stop wall forming a limit along a sliding direction along which the filter assembly extends into the attachment interface.

11. The sprayer assembly of claim 1, wherein the tab comprises a stop wall forming a limit along a sliding direction along which the filter assembly extends into the attachment interface.

12. The sprayer assembly of claim 1, the sprayer assembly comprising:

a reservoir formed at least in part by the reservoir wall, wherein the reservoir is configured to receive a fluid, and wherein the outlet body is coupled in fluid communication with the reservoir to receive the fluid to the flowpath at the outlet body.

13. The sprayer assembly of claim 12, the sprayer assembly comprising:

a walled conduit extending from the outlet opening, wherein the conduit is in fluid communication with the flowpath at the outlet body to receive the fluid therethrough.

14. A filter apparatus for a hand tool, the filter apparatus comprising:

a body forming a first opening and a second opening and a flowpath extending between the first opening and the second opening, the body comprising a body wall forming an attachment interface; and a filter assembly comprising a filter wall from which a tab extends, wherein a filter element is positioned at the filter wall, and wherein the filter wall is slidable to the body wall at the attachment interface.

15. The filter apparatus of claim 14, wherein the attachment interface comprises a rail extending along a sliding direction of the filter wall, wherein the rail forms a track along which the filter wall is slidable along the sliding direction.

16. The filter apparatus of claim 15, wherein the attachment interface forms an open end through which the filter wall is slidable into the attachment interface.

17. The filter apparatus of claim 16, wherein the body comprises a stop wall forming a closed end limiting extension of the filter assembly into the attachment interface along the sliding direction.

18. The filter apparatus of claim 17, wherein the stop wall comprises a radius, a curvature, or an angle diverging from a perimeter of the filter wall.

19. The filter apparatus of claim 14, wherein the body wall forms the attachment interface at the first opening.

20. The filter apparatus of claim 14, the filter apparatus comprising:

a nozzle attachable to the body at the second opening.

* * * * *